United States Patent [19]

Schrammen

[11] Patent Number: 4,961,340
[45] Date of Patent: Oct. 9, 1990

[54] METHOD OF AND APPARATUSES FOR ELIMINATING BACKLASH INFLUENCE WHEN MEASURING OR SETTING MOTOR VEHICLE FRONT WHEEL TRACK

[75] Inventor: Peter Schrammen, Lohfelden, Fed. Rep. of Germany

[73] Assignee: WECO Industrietechnik GmbH, Kassel, Fed. Rep. of Germany

[21] Appl. No.: 310,155

[22] Filed: Feb. 14, 1989

[51] Int. Cl.$^5$ .......................................... G01M 19/00
[52] U.S. Cl. ..................................................... 73/118.1
[58] Field of Search ................. 73/118.1; 33/335, 336, 33/645, 203, 203.12, 203.13, 203.14, 203.15, 203.18

[56] References Cited

FOREIGN PATENT DOCUMENTS

| 52802 | 3/1982 | Japan | 33/203 |
| 201306 | 9/1987 | Japan | 33/335 |

Primary Examiner—Jerry W. Myracle
Attorney, Agent, or Firm—Fleit, Jacobson, Cohn, Price, Holman & Stern

[57] ABSTRACT

Method of eliminating the influence of the steering backlash on the measuring or setting of the individual front wheel track on motor vehicles and apparatus for implementation of the method. The steering wheel (1) is set in a periodically rocking motion (P) about a given central position (M) during the measuring or the setting of the track, the amplitude of which motion is at least as great as half the value of the steering backlash. To generate the rocking motion of the steering wheel, a motor (3) which is arranged on the chassis (5) and the output shaft (6) of which is connected to the steering wheel (1) via an eccentric disk (7) and a thrust rod (8) may be used. The amplitude of the motion of the steering wheel (1) is determined by the eccentric disk (7), while the central position (M) can be set by an adjusting device (9) such that the steering wheel spoke (2) is horizontal.

11 Claims, 2 Drawing Sheets

METHOD OF AND APPARATUSES FOR ELIMINATING BACKLASH INFLUENCE WHEN MEASURING OR SETTING MOTOR VEHICLE FRONT WHEEL TRACK

The invention relates to a method of eliminating the influence of steering backlash on the measuring or setting of the individual front wheel track on motor vehicles and to an apparatus for implementation of this method.

For some years, ever higher demands have been made on the setting of the track of vehicle wheels on motor vehicles, ie. the maintenance of ever closer tolerances is demanded.

Various designs of apparatuses for measuring the axial geometry at the wheel axles of motor vehicles are known. By way of example, reference is made in this respect to German Auslegeschrift 2,204,918, German Offenlegungsschrift 3,136,145, German Offenlegungsschrift 3,323,367 and German Offenlegungsschrift 3,514,759.

The setting of the individual front wheel track has proved to be a particular problem in this context. An objective to be aimed for consists not only in setting as accurately as possible the overall track predetermined by the design of the chassis, to achieve optimum driving characteristics, but in addition to set the front wheels such that the vehicle travels exactly straight when the steering wheel spoke is horizontal, or that when travelling straight under otherwise ideal conditions (ie. no side wind etc.), the steering wheel spoke is exactly horizontal.

To achieve this objective, for some years both the running direction of the rear wheels and the instantaneous position of the steering wheel spoke (in relation to the horizontal) has been taken into account when setting the individual front wheel track. (See for example German Offenlegungsschrift 3,136,145, page 4, lines 24 to 28; page 6, lines 9 to 15). In theory, this would lead to the desired result if the connection between the steering wheel and the front wheels, that is the steering gear, were designed completely free from backlash. Since such a freedom from backlash cannot be achieved in practice, an insecurity of the steering wheel position of the order of magnitude of the said mechanical backlash remains even with the most conscientious setting of the track. Thus, in principle, the desired more accurate setting of the individual front wheel track cannot be achieved by a further increase in the measuring accuracy of an apparatus but only by the steering wheel being held exactly in the center of the range of backlash during the track setting.

The invention is based on the object of creating a method of the type mentioned at the beginning and in the preamble of Patent claim 1 which can also be used in the measuring and/or the setting of the individual front wheel track on motor vehicles by known methods, in order to eliminate the influence of the backlash on the accuracy of the measurement or of the setting.

This object is achieved by the features from the characterizing part of Patent claim 1. Advantageous further developments of the method according to the invention are described in claims 2 and 3.

An apparatus for implementation of the method according to the invention is the subject of Patent claim 4. Advantageous embodiments of this apparatus are described in Patent claims 5 to 11.

The method according to the invention and the apparatus according to the invention can be used together with methods and apparatuses known per se for measuring and setting the backlash.

The basic idea of the invention consists in imparting such a rocking motion on the steering wheel during the measuring or the setting of the track that the steering is just as much on the left as on the right border of the range of backlash, that is to say at the mid point in time comes to rest precisely in the middle of the range of backlash. For exact setting of the track, it is then also necessary either to ensure by suitable means that the mid position of the motion coincides with the desired horizontal position of the steering wheel spoke or else to measure the instantaneous steering wheel position continuously with a suitable device, which is known by the name "steering wheel measuring balance", and to calculate with the measured track.

The method according to the invention is explained in more detail below with reference to a number of exemplary embodiments of apparatuses for its implementation, which are represented in the enclosed drawings, in which.

In FIGS. 1 to 4, only the apparatus parts which serve the periodic rocking motion of the steering wheel are represented. The measuring and setting of the track itself takes place by methods known per se and with apparatuses known per se.

Figure 1:
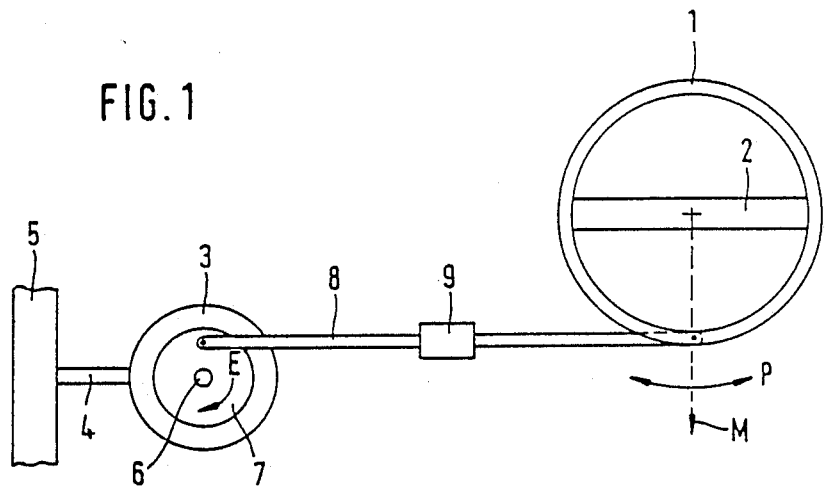
FIG. 1 shows in a greatly schematicized representation an apparatus for the periodic rocking motion of the steering wheel, arranged on the chassis of a motor vehicle.

In FIG. 1, an apparatus is represented in which a motor 3 is fastened via a bracket 4 to a part 5 of the motor vehicle, for example to the motor vehicle door. On the output shaft 6 of the motor 3 there is seated an eccentric disk 7, which is connected via a thrust rod 8 to the steering wheel 1. The length of the thrust rod 8 can be adjustably altered by an adjusting device 9. If the eccentric disk 7 is set in rotation in arrow direction E, a rocking motion in arrow direction P about a central position M is transmitted to the steering wheel 1. The amplitude of this rocking motion is set on the eccentric disk 7 by suitable choice of the radius such that it is at least as great as half the value of the steering backlash. Operation of the adjusting device 9 allows the central position M of the motion to be set such that, in it, the steering wheel spoke 2 is set precisely horizontal. The reference point in the measuring of the individual wheel track is then the central position M of the steering wheel 1.

The motor 3 may be designed as an electric or pneumatic motor or else as any other mechanism.

In principle, a pneumatic cylinder may also be arranged at this point on the chassis, the piston rod of which cylinder is connected to the steering wheel 1 via the thrust rod 8.

Figure 2:
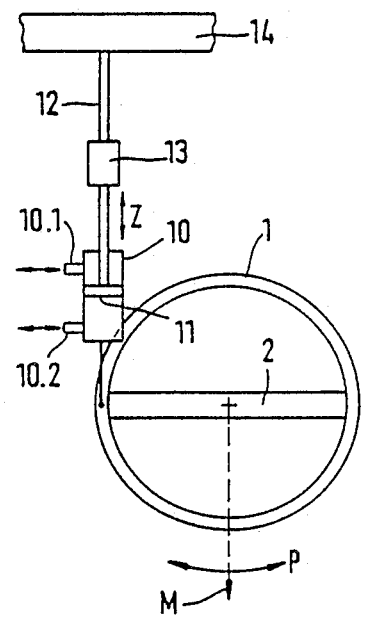
FIG. 2 shows, in a representation analagous to FIG. 1, a second embodiment of an apparatus for the periodic rocking motion of the steering wheel, arranged on the steering wheel and supported on the chassis.

In the case of the embodiment according to FIG. 2, the drive device is designed as a pneumatic cylinder 10, which is fastened to the steering wheel 1 and to which compressed air is fed alternately via the feed/discharge connections 10.1 and 10.2. The piston 11 of the pneumatic cylinder 10 is supported via a support rod 12, into which an adjusting device 13 is connected at a fixed point of the motor vehicle, for example the front windshield 14.

The operating principle of this drive mechanism is analagous to FIG. 1. The relative motion between the pneumatic cylinder 10 and the support rod 12 in arrow direction Z causes a rocking motion of the steering wheel 1 in arrow direction P with the central position M. The precise alignment of the steering wheel spoke 2 in horizontal direction for the central position M can be carried out on the adjusting device 13.

Figure 3:
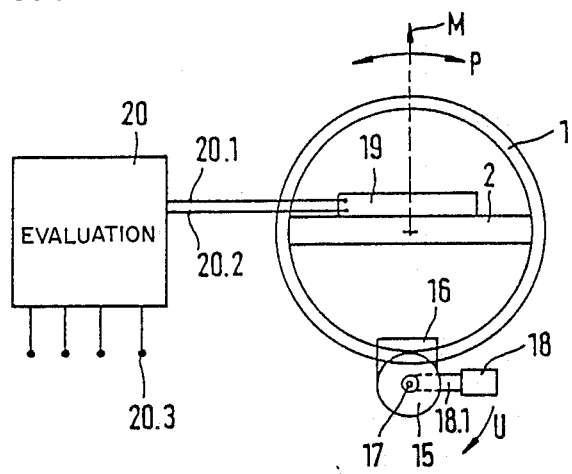
FIG. 3 shows a third embodiment of an apparatus for the periodic rocking motion of the steering wheel, which is arranged on the steering wheel itself.
Figure 4:
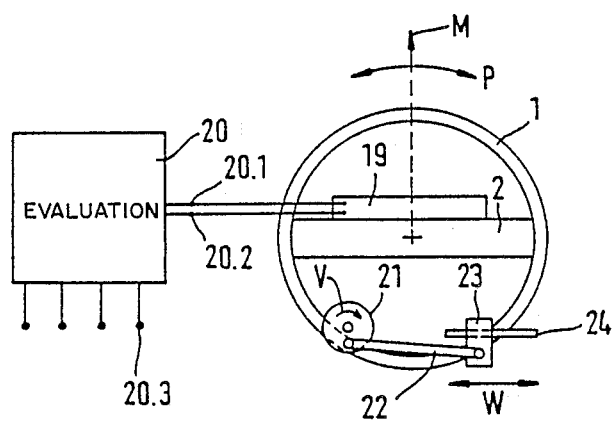
FIG. 4 shows a further embodiment of an apparatus for the periodic rocking motion of the steering wheel, arranged on the steering wheel itself.

In FIGS. 3 and 4, apparatuses are represented which do not require any fixed support at a point inside or outside the motor vehicle, but are only fastened directly to the steering wheel.

In the case of the embodiment according to FIG. 3, a motor, for example an electric motor 15, is fastened by means of a bracket 16 to the steering wheel 1. On its output shaft 17, there is fastened an inert mass 18, via a bracket 18.1. If the motor is set in rotation, the inert mass 18 moves as flyweight on a circular path in arrow direction U and, due to the forces of reaction, the desired periodic rocking motion of the steering wheel in arrow direction P about the central position M is produced. The amplitude of this rocking motion is dependent on the distance of the inert mass 18 from its axis of rotation.

In this apparatus, the setting of the steering wheel spoke 2 can be carried out using a steering wheel measuring balance 19, which is placed on the steering wheel spoke 2 and emits electric signals via inputs 20.1 and 20.2 to an evaluation device 20. In this way, either the steering wheel spoke 2 can be set precisely horizontal or the signals obtained during the motion are processed in the evaluation device 20 together with the measured values for the track measurement, fed via inputs 20.3.

In FIG. 4, a variant of the embodiment according to FIG. 3 is represented.

The drive motor arranged on the steering wheel bears an eccentric disk 21, which is connected via a thrust rod 22 to an inert mass 23, which runs in a guide 24, likewise arranged on the steering wheel 1. A rotation of the eccentric disk in arrow direction V generates a rocking motion of the inert mass 23 in arrow direction W and the forces of reaction occurring generate the rocking motion of the steering wheel 1 in arrow direction P about the central position M. The setting of the steering wheel spoke 2 can be carried out using the steering wheel measuring balance 19, as described with reference to FIG. 3.

I claim:

1. Method of eliminating the influence of steering backlash on the measuring or setting of the individual front wheel track on motor vehicles, characterized in that the steering wheel is set in a periodically rocking motion about a given central position during the measuring or the setting of the track, the amplitude of which motion is at least as great as half the value of the steering backlash.

2. Method according to claim 1, characterized in that the central position of the periodically rocking motion is set such that the steering wheel spoke is horizontal in this central position.

3. Method according to claim 1, characterized in that the central position of the periodically rocking motion is measured automatically and an electric signal representing the measured values is passed to an evaluation device for processing of the measured values for calculation of the track, in which device the measured values for the central position are processed together with the measured values for the track.

4. Apparatus for eliminating the influence of steering backlash on the measuring or setting of the individual front wheel track on motor vehicles characterized by a drive device attached to a motor vehicle for the generation of a periodic motion, means for transmission of this periodic motion to a steering wheel on the motor vehicle as a periodically rocking motion of given amplitude about a central position, and means for setting and measuring the central position of the steering wheel.

5. Apparatus according to claim 4, characterized in that the drive device is arranged at a fixed point in relation to the motor vehicle and is connected to the steering wheel via a coupling element acting substantially tangentially on the steering wheel.

6. Apparatus according to claim 5, characterized in that the drive device has a drive motor, an eccentric driven by said motor, said coupling element connecting the drive device to the steering wheel being in the form of a thrust rod.

7. Apparatus according to claim 4, characterized in that the drive device is arranged on the steering wheel and is supported via a supporting element at a fixed point in relation to the motor vehicle.

8. Apparatus according to claim 7, characterized in that the drive device includes a pneumatic cylinder, a piston movably disposed in said cylinder, a thrust rod connected to the piston and extending outwardly from the cylinder and connected with a fixed part of the motor vehicle.

9. Apparatus according to claim 4, characterized in that the drive device is arranged on the steering wheel and the rocking motion of the steering wheel is generated by periodic shifting of an inert mass coupled to the drive device, due to the forces of reaction occurring.

10. Apparatus according to claim 9, characterized in that the drive device has a drive motor having an output shaft on which the inert mass is eccentrically arranged.

11. Apparatus according to claim 9, characterized in that the drive device has a drive motor, an eccentric drivingly connected to the drive motor, and a thrust rod connecting the eccentric to the inert mass for periodically shifting the inert mass.

* * * * *